United States Patent
Ichiryu

(10) Patent No.: US 10,882,357 B2
(45) Date of Patent: Jan. 5, 2021

(54) PNEUMATIC TIRE AND METHOD FOR MANUFACTURING PNEUMATIC TIRE

(71) Applicant: SUMITOMO RUBBER INDUSTRIES, LTD., Hyogo (JP)

(72) Inventor: Yutaka Ichiryu, Shiga (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 412 days.

(21) Appl. No.: 15/465,597

(22) Filed: Mar. 22, 2017

(65) Prior Publication Data
US 2017/0274707 A1    Sep. 28, 2017

(30) Foreign Application Priority Data
Mar. 28, 2016    (JP) .................... 2016-063585

(51) Int. Cl.
*B60C 9/18*    (2006.01)
*B60C 9/26*    (2006.01)
(Continued)

(52) U.S. Cl.
CPC ............ *B60C 9/20* (2013.01); *B29D 30/1635* (2013.01); *B29D 30/30* (2013.01); *B29D 30/3035* (2013.01); *B29D 30/70* (2013.01); *B60C 9/2204* (2013.01); *B60C 9/263* (2013.01); *B60C 2009/2012* (2013.01); *B60C 2009/2016* (2013.01); *B60C 2009/2025* (2013.01); *B60C 2009/2035* (2013.01); *B60C 2011/0091* (2013.01); *B60C 2200/10* (2013.01)

(58) Field of Classification Search
CPC ........... B60C 9/18; B60C 9/2204; B60C 9/26; B60C 9/263; B60C 2009/2035; B60C 2009/2038; B60C 2009/2219; B60C 2009/2223
See application file for complete search history.

(56) References Cited

FOREIGN PATENT DOCUMENTS

| CN | 1984785 | 6/2007 |
|---|---|---|
| CN | 101855097 | 10/2010 |

(Continued)

OTHER PUBLICATIONS

"Office Action of China Counterpart Application", dated Apr. 9, 2020, with English translation thereof, p. 1-p. 14.
(Continued)

*Primary Examiner* — Justin R Fischer
(74) *Attorney, Agent, or Firm* — JCIPRNET

(57) ABSTRACT

A pneumatic tire excellent in high speed stability and turning ability is provided. In a band of a tire, a center portion located in an axial center has a helically wound structure in which a first band body including a first cord is wound. A shoulder portion located on an axial outside of the center portion has a meshed structure formed by a second band body including a second cord. The shoulder portion includes a plurality of first portions, a plurality of second portions and a plurality of third portions. Each first portion is inclined and extends from an axially inner end of the shoulder portion to an axially outer end of the shoulder portion. Each second portion is inclined in an opposite direction from the first portion and extends from the axially inner end of the shoulder portion to the axially outer end of the shoulder portion.

7 Claims, 6 Drawing Sheets

(51) Int. Cl.
      *B60C 9/20*       (2006.01)
      *B29D 30/16*     (2006.01)
      *B29D 30/30*     (2006.01)
      *B60C 9/22*       (2006.01)
      *B29D 30/70*     (2006.01)
      *B60C 11/00*      (2006.01)

(56) References Cited

FOREIGN PATENT DOCUMENTS

| | | | |
|---|---|---|---|
| EP | 416893 | * | 3/1991 |
| EP | 501782 | * | 9/1992 |
| EP | 2070690 | * | 5/2014 |
| JP | H05178007 | | 7/1993 |
| JP | 2007022374 | | 2/2007 |
| JP | 2009096420 | | 5/2009 |
| JP | 2015174569 | | 10/2015 |
| TW | 207693 | | 6/1993 |

OTHER PUBLICATIONS

"Office Action of Taiwan Counterpart Application", dated Oct. 6, 2020, with English translation thereof, p. 1-p. 21.

* cited by examiner

PNEUMATIC TIRE AND METHOD FOR MANUFACTURING PNEUMATIC TIRE

CROSS-REFERENCE TO RELATED APPLICATION

This application claims the priority benefit of Japan Application no. 2016-063585, filed on Mar. 28, 2016. The entirety of the above-mentioned patent application is hereby incorporated by reference herein and made a part of this specification.

BACKGROUND OF THE INVENTION

Field of the Invention

The present invention relates to a pneumatic tire.

Description of the Related Art

A tire for two-wheeled vehicles may include a belt for reinforcing a carcass. Generally, the belt has a two-cut structure. On the belt, a plurality of cords inclined with respect to a circumferential direction and a plurality of cords inclined in an opposite direction from the aforementioned plurality of cords with respect to the circumferential direction are superimposed. An absolute value of an inclination angle of the cords typically ranges from 17° to 24°. The belt contributes to torsional rigidity of the tire. This tire has a large cornering power. This tire is excellent in response and turning ability. On the other hand, owing to the large cornering power, kickback is likely to be caused by an external disturbance input during high-speed traveling. Furthermore, the belt does not have a high binding force with respect to the carcass. The tire including the belt may be inferior in high speed stability.

A tire for two-wheeled vehicles may include a band for reinforcing a carcass. Generally, the band has a structure in which a cord is wound in a substantially circumferential direction. The band is excellent in binding force. Torsional rigidity of the tire including the band is not as high as the torsional rigidity of the tire including the belt. Cornering power of this tire is less than the cornering power of the tire including the belt. This tire suppresses kickback. This tire is excellent in high speed stability. On the other hand, due to suppressed cornering power, this tire may be inferior in response and turning ability.

Various studies have been made on the structures of the belt and the band in order to achieve both high speed stability and turning ability. One of the studies is disclosed in JP 2015-174569. FIG. 6 shows a structure of a band 2 disclosed in this document. In the drawing, the up-down direction represents a circumferential direction, the left-right direction represents an axial direction, and a direction perpendicular to the paper surface represents a radial direction. The band 2 has a structure in which a band body 4 made of a cord and topping rubber is wound in a meshed manner. The band body 4 is wound inclined with respect to the circumferential direction. The band body 4 is turned up at an axially outer end 6 of the band 2.

PRIOR-ART DOCUMENTS

Patent Documents

Patent Document 1: JP 2015-174569

SUMMARY OF THE INVENTION

Problems to be Solved by the Invention

A tire having further improved high speed stability and turning ability is desired. In the band 2 of the above Patent Document 1, the band body 4 is inclined with respect to the circumferential direction. The inclined band body 4 contributes to torsional rigidity. This tire has large torsional rigidity. There is room for improvement in kickback resistance of this tire. Furthermore, as shown in FIG. 6, the band body 4 is almost non-existent on the axially outer end of the band 2. This leads to unbalanced tire rigidity in the vicinity of the end of the band. This can be a main cause of reduction in stability particularly during full bank during which a vehicle body is greatly tilted. There is room for improvement in stability of this tire during turning.

The present invention provides a tire excellent in high speed stability and turning ability.

Means for Solving the Problems

A tire according to the present invention includes a tread and a band. The band is located on a radial inside of the tread. The band includes a center portion located in an axial center and a shoulder portion located on an axial outside of the center portion. The center portion has a helically wound structure in which a first band body including a first cord is wound in a circumferential direction. The shoulder portion has a meshed structure formed by a second band body including a second cord. The shoulder portion includes a plurality of first portions, a plurality of second portions and a plurality of third portions. Each first portion is inclined with respect to the circumferential direction and extends from an axially inner end of the shoulder portion to an axially outer end of the shoulder portion. Each second portion is inclined in an opposite direction from the first portion with respect to the circumferential direction and extends from the axially inner end of the shoulder portion to the axially outer end of the shoulder portion. Each third portion extends in the circumferential direction on the axially outer end of the shoulder portion. The plurality of the first portions, the plurality of the second portions and the plurality of the third portions are jointlessly connected so as to form one second band body.

Preferably, one end of each of the first portions is connected to one end of each of the third portions, and the other end of the each of the third portions is connected to one end of each of the second portions, thereby forming a basic unit. The shoulder portion has a structure in which the basic units are repeatedly connected to each other.

Preferably, the plurality of the third portions are arranged in the circumferential direction with no gap and no overlap therebetween.

Preferably, the first band body is jointlessly connected to the second band body at a boundary between the center portion and the shoulder portion.

Preferably, an absolute value of an inclination angle θ1 of the first portion with respect to the circumferential direction is 1° or greater and 10° or less. An absolute value of an inclination angle θ2 of the second portion with respect to the circumferential direction is 1° or greater and 10° or less.

Preferably, the absolute value of the inclination angle θ1 is the same as the absolute value of the inclination angle θ2.

Preferably, the shoulder portion is located on both axial outsides of the center portion.

A manufacturing method according to the present invention is a method for manufacturing a pneumatic tire for two-wheeled vehicles, the pneumatic tire including a tread, and a band located on a radial inside of the tread. The band includes a center portion located in an axial center thereof, and a shoulder portion located on an axial outside of the center portion. The manufacturing method includes a step of laminating the band and a step of laminating the tread. The step of laminating the band further includes a step of winding a second band body in a meshed manner to obtain the shoulder portion and a step of winding a first band body in a circumferential direction to obtain the center portion. In the step to obtain the shoulder portion, by repeating a step of inclining the second band body with respect to the circumferential direction and winding the second band from a position taken as an axially inner end of the shoulder portion to a position taken as an axially outer end of the shoulder portion, a step of winding the second band body in the circumferential direction in the position taken as the axially outer end of the shoulder portion, and a step of inclining the second band body in a direction opposite to the aforementioned direction with respect to the circumferential direction and winding the second band body from the position taken as the axially outer end of the shoulder portion to the position taken as the axially inner end of the shoulder portion, the second band body is wound in the meshed manner.

Effects of the Invention

The band of the tire according to the present invention includes the center portion located in the axial center. The center portion has the helically wound structure in which the first band body including the first cord is wound in the circumferential direction. During high-speed traveling, a radial outside of the center portion mainly contacts the ground. Binding force of the first band body extending in the circumferential direction is strong. Accordingly, deformation of the tread caused by centrifugal force during high-speed traveling is suppressed. Furthermore, since the first band body extends in the circumferential direction, torsional rigidity in the vicinity of the center of the tread is suppressed. The tire including the band suppresses kickback from occurring during high-speed traveling. The tire is excellent in high speed stability.

The band includes the shoulder portion located on the axial outside of the center portion. The shoulder portion has the meshed structure formed by the second band body including the second cord. The shoulder portion includes in the circumferential direction a plurality of the first portions and a plurality of the second portions inclined in opposite directions from each other. The first portion and the second portion contribute to the torsional rigidity in the vicinity of the shoulder portion. During turning, a radial outside of the shoulder portion mainly contacts the ground. The tire including the band has a large cornering power during turning. The tire is excellent in response and turning ability.

The second band body includes a plurality of the third portions extending in the circumferential direction on the axially outer end of the shoulder portion. The third portion adjusts the balance of rigidity of the tire in the vicinity of the end of the band. During full bank, even a radially outer part in the vicinity of the end of the band may contact the ground. The third portion contributes to stability during full bank. The tire realizes excellent operation stability even during full bank.

DESCRIPTION OF THE EMBODIMENTS

The present invention is hereinafter explained in detail based on preferred embodiments with reference to suitable drawings.

Figure 1:
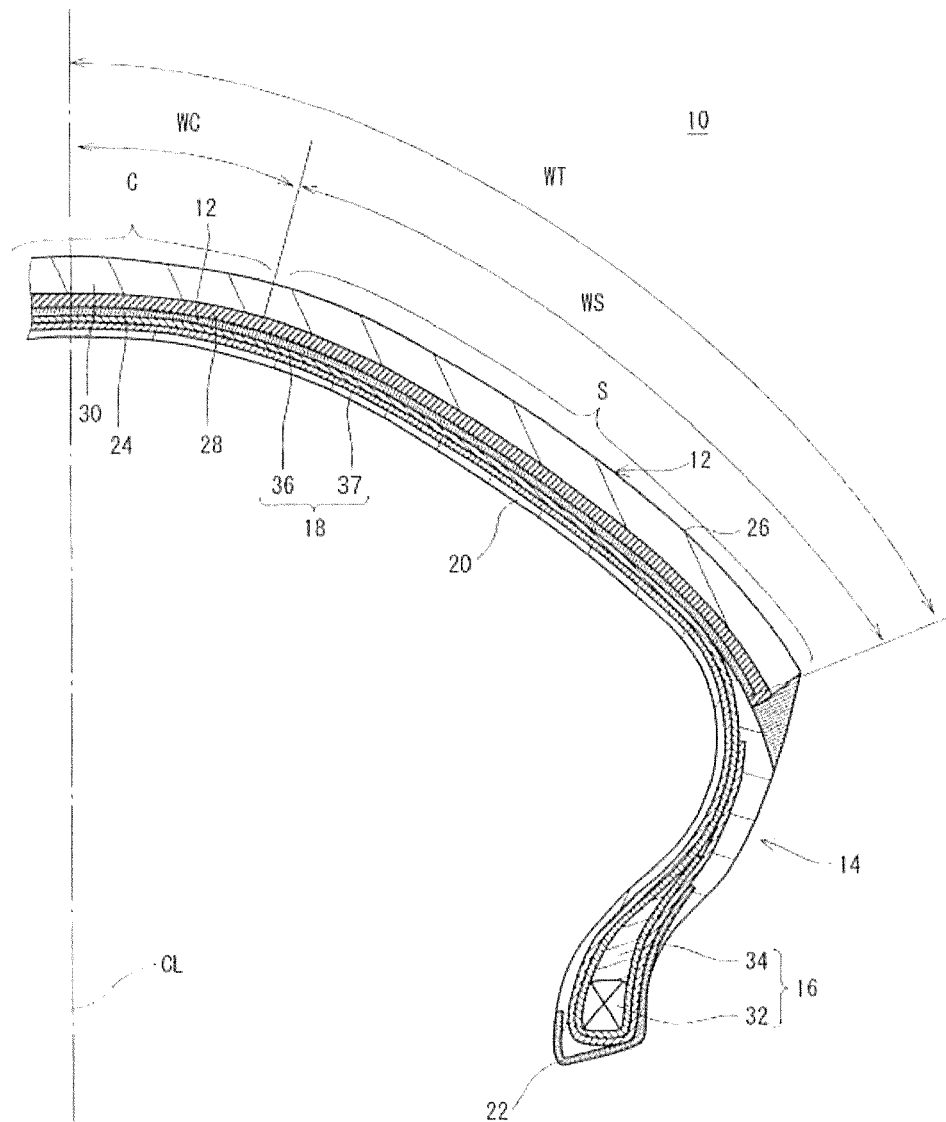
FIG. 1 is a cross-sectional view showing a part of a pneumatic tire according to an embodiment of the present invention.

FIG. 1 shows a pneumatic tire 10 for two-wheeled vehicles. The tire 10 is particularly mounted on a front wheel of a two-wheeled vehicle. In FIG. 1, the up-down direction represents a radial direction, the left-right direction represents an axial direction, and a direction perpendicular to the paper surface represents a circumferential direction. The tire 10 has a shape substantially bilaterally symmetric about a dot-and-dash line CL in FIG. 1. The dot-and-dash line CL represents an equatorial plane of the tire 10. The tire 10 is a tubeless tire.

The tire 10 includes a tread 12, a pair of sidewalls 14, a pair of beads 16, a carcass 18, an inner liner 20, a chafer 22 and a band 24.

The tread 12 has a shape projecting outward in the radial direction. The tread 12 includes a tread surface 26. The tread surface 26 contacts a road surface. Although not illustrated, a groove may be cut into the tread surface 26, thereby forming a tread pattern. The tread 12 includes a base layer 28 and a cap layer 30. The cap layer 30 is located on a radial outside of the base layer 28. The cap layer 30 is laminated on the base layer 28. The base layer 28 is made of crosslinked rubber excellent in adhesiveness. A typical base material rubber of the base layer 28 is natural rubber. The cap layer 30 is made of crosslinked rubber excellent in abrasion resistance, heat resistance and grip performance.

Each sidewall 14 extends substantially inward in the radial direction from an end of the tread 12. The sidewall 14 is made of crosslinked rubber. The sidewall 14 absorbs an impact from the road surface by bending. The sidewall 14 prevents external damage to the carcass 18.

Each bead 16 is located substantially inside of the sidewall 14 in the axial direction. The bead 16 includes a core 32, and an apex 34 extending outward in the radial direction from the core 32. The core 32 is ring-shaped. The core 32 is wound around by a non-stretchable wire. A typical material of the wire is steel. The apex 34 is tapered outward in the radial direction. The apex 34 is made of high-hardness crosslinked rubber.

The carcass 18 includes a first ply 36 and a second ply 37. The first ply 36 and the second ply 37 are stretched between the beads 16 on both sides, along the tread 12 and the sidewall 14. The first ply 36 is turned up around the core 32 from inside to outside in the axial direction. The second ply 37 is turned up around the core 32 from inside to outside in the axial direction.

Although not illustrated, the first ply 36 and the second ply 37 are each made of a large number of cords arranged in parallel and topping rubber. An absolute value of an angle of each cord with respect to the equatorial plane ranges from 65° to 90°. In other words, the carcass 18 has a radial structure. The cord is made of an organic fiber. Examples of preferable organic fiber include a polyester fiber, a nylon fiber, a rayon fiber, a polyethylene naphthalate fiber, and an aramid fiber. The carcass 18 may also be formed from one ply.

The inner liner 20 is located on an inside of the carcass 18. The inner liner 20 is joined to an inner surface of the carcass 18. The inner liner 20 is made of crosslinked rubber. A rubber excellent in air shielding property is used for the inner liner 20. A typical base material rubber of the inner liner 20 is butyl rubber or halogenated butyl rubber. The inner liner 20 maintains an internal pressure of the tire 10.

Each chafer 22 is located in the vicinity of the bead 16. When the tire 10 is incorporated into a rim (not illustrated), the chafer 22 abuts the rim. By this abutting, the vicinity of the bead 16 is protected. The chafer 22 is made of a fabric and a rubber impregnated into the fabric.

The band 24 is located on a radial inside of the tread 12. The band 24 is located on a radial outside of the carcass 18. The band 24 is laminated on the carcass 18. The band 24 contributes to rigidity of the tire 10 in the radial direction. The band 24 is capable of suppressing the influence of centrifugal force acting during traveling.

As shown in FIG. 1, the band 24 includes a center portion C and a shoulder portion S. The center portion C is located in the axial center. The center portion C intersects the equatorial plane CL. The shoulder portion S is located on an axial outside of the center portion C. An outer end of the shoulder portion S is an outer end of the band 24 in the axial direction. In this embodiment, a pair of the shoulder portions S are located on both outsides of the center portion C.

As described later, the band 24 is formed by a first band body and a second band body. The first band body and the second band body are explained prior to an explanation of the structure of the band 24.

Figure 2:
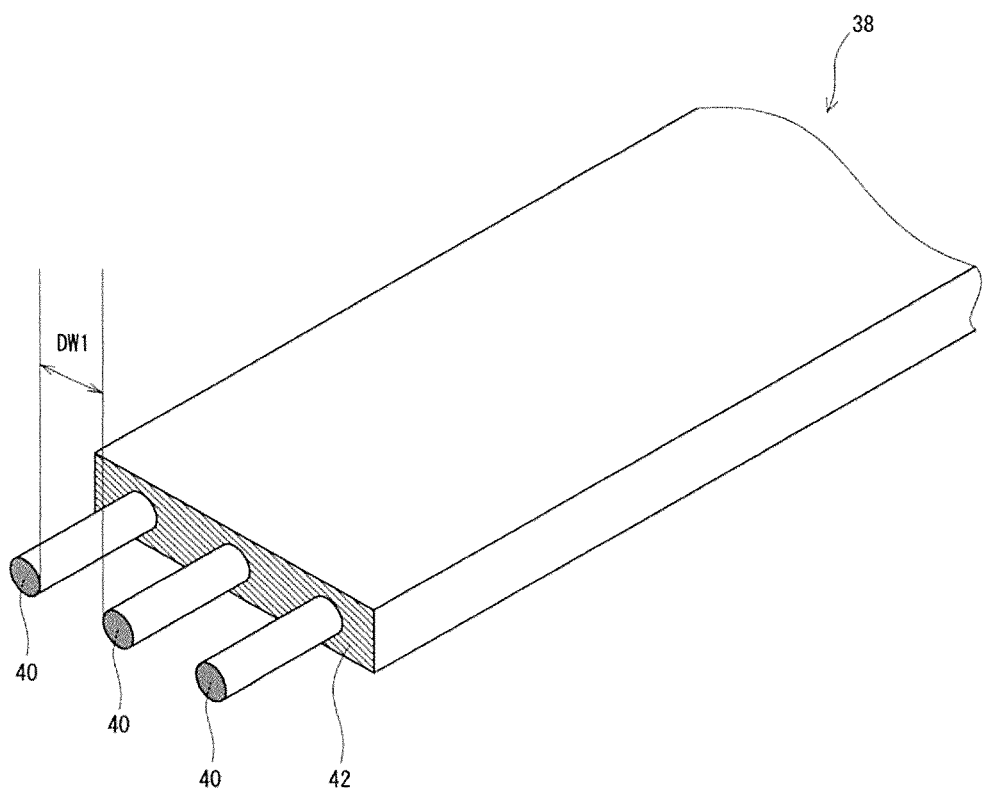
FIG. 2 is a prospective cross-sectional view showing a first band body that forms a band of the tire in FIG. 1.

FIG. 2 is a prospective cross-sectional view of a first band body 38. The first band body 38 includes a first cord 40 and topping rubber 42. A preferable material of the first cord 40 is an organic fiber. Examples of preferable organic fiber include a nylon fiber, a polyester fiber, a rayon fiber, a polyethylene naphthalate fiber, and an araid fiber. Steel may also be used for the first cord 40.

Although not illustrated, the second band body includes a second cord and topping rubber. A preferable material of the second cord is an organic fiber. Examples of preferable organic fiber include a nylon fiber, a polyester fiber, a rayon fiber, a polyethylene naphthalate fiber, and an aramid fiber. Steel may also be used for the second cord.

Figure 3:
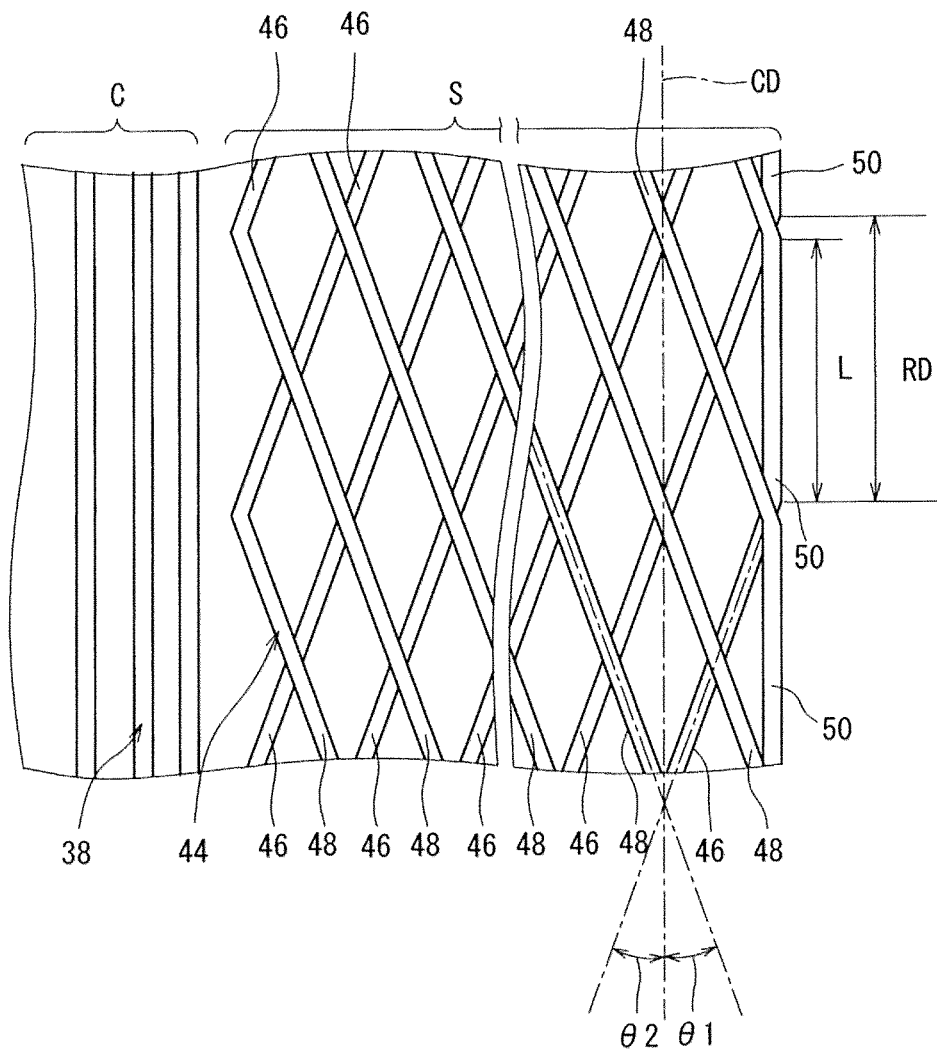
FIG. 3 is a plan view showing a structure of the band of the tire in FIG. 1.

FIG. 3 shows the structure of the band 24. In FIG. 3, the up-down direction represents the circumferential direction, the left-right direction represents the axial direction, and a direction perpendicular to the paper surface represents the radial direction. In FIG. 3, a dot-and-dash line CD is a phantom line extending in the circumferential direction.

The center portion C is formed by the belt-shaped first band body 38. The center portion C has a helically wound structure in which the first band body 38 is wound in the circumferential direction. An absolute value of an angle between the first band body 38 and the circumferential direction is less than 1°. Thus, in the center portion C, an angle between the first cord 40 and the circumferential direction is less than 1°.

The shoulder portion S is formed by a belt-shaped second band body 44. As shown in FIG. 3, the shoulder portion S has a meshed structure formed by the second band body 44.

The shoulder portion S includes a plurality of first portions 46, a plurality of second portions 48 and a plurality of third portions. The above meshed structure is composed of the plurality of the first portions 46, the plurality of the second portions 48 and the plurality of the third portions 50. That is, these first portions 46, second portions 48 and third portions 50 are each made of the second band body 44.

Each first portion 46 is inclined with respect to the circumferential direction. The first portion 46 extends from an axially inner end of the shoulder portion to an axially outer end of the shoulder portion S. Each second portion 48 is inclined with respect to the circumferential direction. An inclination direction of the second portion 48 is opposite an inclination direction of the first portion 46. The second portion 48 extends from the axially inner end of the shoulder portion to the axially outer end of the shoulder portion S. Each third portion 50 is located on the axially outer end of the shoulder portion S. The third portion 50 extends in the circumferential direction on the axially outer end of the shoulder portion S.

In this specification, when it is described that the first portion 46 is inclined with respect to the circumferential direction, it means that an absolute value of an angle between the first portion 46 and the circumferential direction is 1° or greater. Thus, at this part, an absolute value of an angle between the second cord and the circumferential direction is 1° or greater. When it is described that the second portion 48 is inclined with respect to the circumferential direction, it means that an absolute value of an angle between the second portion 48 and the circumferential direction is 1° or greater. At this part, the absolute value of the angle between the second cord and the circumferential direction is 1° or greater. When it is described that the third portion 50 extends in the circumferential direction, it means that an absolute value of an angle between the third portion 50 and the circumferential direction is less than 1°. At this part, the absolute value of the angle between the second cord and the circumferential direction is less than 1°.

As shown in FIG. 3, the plurality of the first portions 46, the plurality of the second portions 48 and the plurality of the third portions 50 are connected. They are jointlessly connected so as to form one second band body 44. In other words, the shoulder portion S has a structure in which one second band body 44 is wound in a meshed manner. By this winding, the shoulder portion S is formed having the plurality of the first portions 46, the plurality of the second portions 48 and the plurality of the third portions 50.

In the shoulder portion S, one end of each first portion 46 is connected to one end of the third portion 50. The other end of this third portion 50 is connected to one end of the second portion 48. Accordingly, a basic unit is formed. In the shoulder portion S, the basic units are repeatedly connected to each other. The shoulder portion S has a structure in which the basic units are repeatedly connected to each other.

In FIG. 2, a double-headed arrow DW1 represents a distance between adjacent first cords. The distance DW1 is 0.5 mm or more and 10 mm or less. The number of the first cord 40 in the first band body 38 is one or more and ten or less. In FIG. 2, the number of the first cord 40 is three.

Although not illustrated, a double-headed arrow DW2 represents a distance between adjacent second cords. The distance DW2 is 0.5 mm or more and 10 mm or less. The number of the second cord in the second band body 44 is set to one or more and ten or less.

The first band body 38 may be the same as the second band body 44. Furthermore, the first band body 38 may be connected to the second band body 44 at a boundary between the center portion C and the shoulder portion S. The first band body 38 may be jointlessly connected to the second band body 44.

A manufacturing method of the tire 10 is hereinafter explained. The manufacturing method of the tire 10 includes a step (referred to as forming step) of obtaining a raw cover, and a step (referred to as vulcanization step) of vulcanizing the raw cover to obtain the tire 10.

In the forming step, components of the tire 10 are laminated on an outer surface of a toroidal core. This step includes a step of laminating the inner liner 20, a step of laminating the carcass 18, a step of laminating the band 24 and a step of laminating the tread 12. In fact, in the forming step, these components are not crosslinked. To be exact, these components are not the same ones as the components after the vulcanization step. For example, the inner liner 20 laminated in the forming step is made of uncrosslinked rubber. By the vulcanization step, the inner liner 20 made of crosslinked rubber may be obtained. In this specification, the same term is used before and after the vulcanization step. Therefore, these are both referred to as "inner liners." The same applies to other components, such as the later-described band bodies, as well as the center portion C and the shoulder portion S of the band 24. These components are made of uncrosslinked rubber before the vulcanization step and made of crosslinked rubber after the vulcanization step.

In the step of laminating the inner liner 20, the inner liner 20 is laminated on the outer surface of the core. In the step of laminating the carcass 18, the carcass 18 is laminated on an outer surface of the inner liner 20. In the step of laminating the band 24, the band 24 is laminated on an outer surface of the carcass 18. In the step of laminating the tread 12, the tread 12 is laminated on an outer surface of the band 24.

The step of laminating the band 24 further includes:

(1) a step of preparing a band body;

(2) a step of winding the band body in a meshed manner to obtain one shoulder portion S;

(3) a step of winding the band body in the circumferential direction to obtain the center portion C; and (4) a step of winding the band body in a meshed manner to obtain the other shoulder portion S.

In the above step (1), a plurality of cords are pushed out together with the topping rubber, and belt-shaped band bodies are obtained. These band bodies are supplied to a former (not illustrated).

Figure 4:
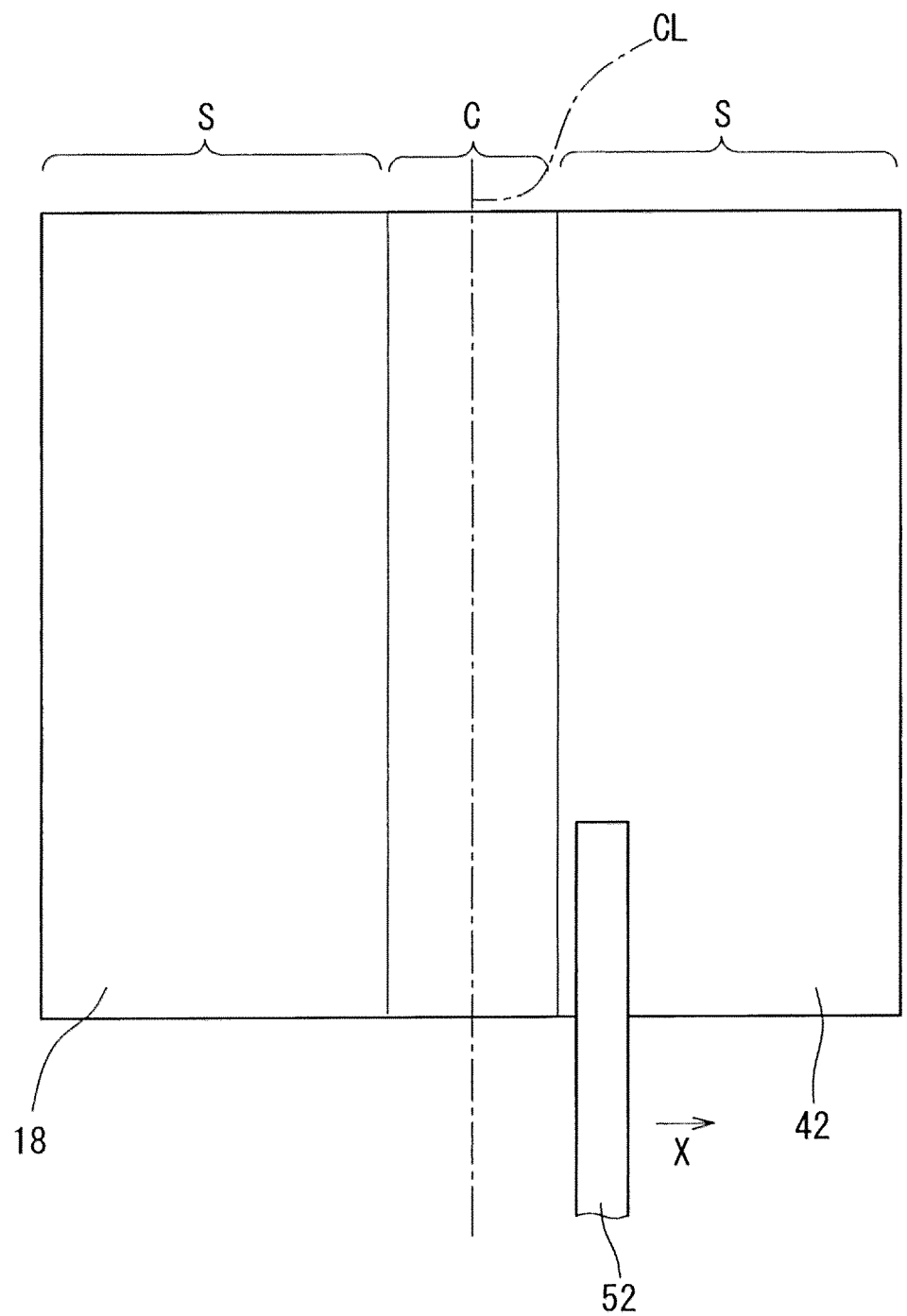
FIG. 4 is a plan view showing a state at the start of formation of the band shown in FIG. 3.

In the above step (2), the band bodies are wound on the carcass 18. FIG. 4 is a plan view showing a state at the start of the step of laminating the band 24. In FIG. 4, the up-down direction represents the circumferential direction, the left-right direction represents the axial direction, and a direction perpendicular to the paper surface represents the radial direction. The equatorial plane CL of the tire 10, and the center portion C and a pair of shoulder portions S of the band 24 manufactured by this manufacturing method are collectively shown. Although not illustrated, this former includes a head. The head sends out a band body 52 and is movable in the axial direction.

In the above step (2), first, a tip of the band body 52 sent out from the head is disposed on the carcass 18. As shown in FIG. 4, in this embodiment, the tip of the band body 52 is disposed in a position taken as the inner end of one shoulder portion S.

Next, the core is rotated in the circumferential direction. The carcass 18 is rotated in the circumferential direction. With the start of rotation of the core, the head is moved in the direction of an arrow X in FIG. 4 while sending out the band body 52. The head is moved from inside to outside in the axial direction. Since the head is moved as the core is rotated, the band body 52 is wound in a helical manner. The head reaches a position taken as the outer end of the shoulder portion S. In this way, the band body 52 is inclined with respect to the circumferential direction and is wound from the position taken as the axially inner end of the shoulder portion S to the position taken as the axially outer end of the shoulder portion S. In this way, the first portion 46 of the shoulder portion S is formed. Next, in a state in which the movement of the head is stopped, the core is rotated. In the position taken as the outer end of the shoulder portion S, the band body 52 is wound in the circumferential direction. In this way, the third portion 50 is formed. Furthermore, as the core is rotated, the head is moved in a direction opposite arrow X in FIG. 4. The head is moved from outside to inside in the axial direction. The head reaches the position taken as the inner end of the shoulder portion S. In this way, the band body 52 is inclined in a direction opposite to the aforementioned direction with respect to the circumferential direction and is wound from the position taken as the axially outer end of the shoulder portion S to the position taken as the axially inner end of the shoulder portion S. In this way, the second portion 48 is formed.

By repeating formation of the first portion 46, formation of the third portion 50 and formation of the second portion 48, the band body 52 is wound in a meshed manner. In this way, the shoulder portion S is obtained. Herein, the wound band body 52 is equivalent to the aforementioned second band body 44. The second band body 44 is obtained from the wound band body 52 by the vulcanization step.

In the above step (3), the tip of the band body 52 sent out from the head is disposed in a position taken as one end of the center portion C. The core is rotated, and the band body 52 is wound in the substantially circumferential direction. The head is moved from one end toward the other end of the center portion C at a speed so that an angle between the winding direction of the band body 52 and the circumferential direction is less than 1°. The band body 52 is wound in a helical manner in the circumferential direction. In this way, the center portion C is obtained. Herein, the wound band body 52 is equivalent to the aforementioned first band body 38. The first band body 38 is obtained from the wound band body 52 by the vulcanization step.

In the above step (4), the tip of the band body 52 is disposed in the position taken as the other shoulder portion S. By the same method as above for obtaining the shoulder portion S, the band body 52 is wound in a meshed manner. In this way, the other shoulder portion S is obtained.

In the above step of obtaining the shoulder portion S, the formation starts from the first portion 46. By changing the start position of the winding, the formation may start from, for example, the second portion 48. The formation may also start from the third portion 50.

In the above formation of the band 24, the center portion C and the shoulder portion S are obtained by winding the same band body 52. That is, the first band body 38 that forms the center portion C is the same as the second band body 44 that forms the shoulder portion S. At this moment, one band body may be continuously wound to form one shoulder portion S, the center portion C and the other shoulder portion S. Accordingly, the second band body 44 of one shoulder portion S is jointlessly connected to the first band body 38 of the center portion C. The first band body 38 of the center portion C is jointlessly connected to the second band body 44 of the other shoulder portion S.

In the above, the shoulder portion S is formed first and then the center portion C is formed. It may also be that the center portion C is formed first and then the shoulder portion S is formed.

It may also be that the former includes a plurality of heads and thereby forms the center portion C and the shoulder portion S in parallel. For example, the former includes a first head, a second head and a third head, and a step of forming the center portion C by winding the first band body 38 sent out from the first head, a step of forming one shoulder portion S by winding the second band body 44 sent out from the second head, and a step of forming the other shoulder portion S by winding the second band body 44 sent out from the third head may be performed in parallel. At this moment, the first band body 38 may be the same as or different from the second band body 44.

After the formation of the band 24, the tread 12 is further laminated on the band 24 to obtain a raw cover (also referred to as an uncrosslinked tire 10).

In the step of vulcanizing the raw cover to obtain the tire 10, the raw cover is pressurized and heated in a cavity formed between a mold and the core. Accordingly, the rubber undergoes a crosslinking reaction and the tire 10 is obtained.

In the above manufacturing method, a core is used. In the step of forming the raw cover, a former including a drum may also be used. In this case, the components of the tire 10 are laminated around the drum. In this case, in the vulcanization step, the raw cover is pressurized and heated in a cavity formed between a mold and a bladder.

Functions and effects of the present invention are hereinafter explained.

The band 24 of the tire 10 according to the present invention includes the center portion C located in the axial center. The center portion C has a helically wound structure in which the first band body 38 including the first cord 40 is wound in the circumferential direction. During high-speed traveling, a radial outside of the center portion C mainly contacts the ground. The binding force of the first band body 38 extending in the circumferential direction is strong. Accordingly, deformation of the tread 12 caused by centrifugal force during high-speed traveling is suppressed. Furthermore, since the first band body 38 extends in the circumferential direction, the torsional rigidity in the vicinity of the center of the tread 12 is suppressed. The tire 10 including the band 24 suppresses kickback from occurring during high-speed traveling. The tire 10 is excellent in high speed stability.

The band 24 includes the shoulder portion S located on the axial outside of the center portion C. The shoulder portion S has a meshed structure formed by the second band body 44 including the second cord. The shoulder portion S includes in the circumferential direction a plurality of the first portions 46 and a plurality of the second portions 48 inclined in opposite directions from each other. The first portion 46 and the second portion 48 contribute to the torsional rigidity in the vicinity of the shoulder portion S. During turning, a radial outside of the shoulder portion S mainly contacts the ground. The tire 10 including the band 24 has a large cornering power during turning. The tire 10 is excellent in response and turning ability.

The second band body 44 includes a plurality of the third portions 50 extending in the circumferential direction on the axially outer end of the shoulder portion S. The third portion 50 adjusts the balance of rigidity of the tire 10 in the vicinity of the end of the band 24. During full bank, even a radially outer part in the vicinity of the end of the band 24 may contact the ground. The third portion 50 contributes to stability during full bank. The tire 10 realizes excellent operation stability even during full bank.

The structure of the band 24 contributes to high speed stability and turning ability. Hence, while high speed stability and turning ability are maintained at the same levels as those of the prior art, the quantity of the cords can be reduced. This contributes reduction in mass and manufacturing cost of the tire 10. The tire 10 including the band 24 is capable of, while maintaining good high speed stability and turning ability, reducing the weight and manufacturing cost of the tire 10.

In FIG. 3, the symbol $\theta 1$ represents the angle between the first portion 46 and the circumferential direction. The absolute value of the angle $\theta 1$ is preferably 1° or greater. By setting the absolute value of the angle $\theta 1$ to 1° or greater, the first portion 46 contributes to the torsional rigidity. The tire 10 including the band 24 has a large cornering power. The tire 10 is excellent in response and turning ability. The absolute value of the angle $\theta 1$ is preferably 10° or less. By setting the absolute value of the angle $\theta 1$ to 10° or less, the torsional rigidity is suitably maintained. The tire 10 including the band 24 suppresses kickback. The tire 10 is excellent in stability during turning.

In FIG. 3, the symbol $\theta 2$ represents the angle between the second portion 48 and the circumferential direction. The absolute value of the angle $\theta 2$ is preferably 1° or greater. By setting the absolute value of the angle $\theta 2$ to 1° or greater, the second portion 48 contributes to the torsional rigidity. The tire 10 including the band 24 has a large cornering power. The tire 10 is excellent in response and turning ability. The absolute value of the angle $\theta 2$ is preferably 10° or less. By setting the absolute value of the angle $\theta 2$ to 10° or less, the torsional rigidity is suitably maintained. The tire 10 including the band 24 suppresses kickback. The tire 10 is excellent in stability during turning.

A ratio of the absolute value of the angle $\theta 2$ to the absolute value of the angle $\theta 1$ is preferably 0.8 or greater and 1.2 or less. In this way, the balance of rigidity of the tire 10 in the vicinity of the shoulder portion S is suitably adjusted. This contributes to the stability during turning. The tire 10 including the band 24 is excellent in turning ability. From this point of view, the ratio of the absolute value of the angle $\theta 2$ to the absolute value of the angle $\theta 1$ is more preferably 0.9 or greater and 1.1 or less. From this point of view, the ratio is most preferably 1.0. That is, it is most preferable that the absolute value of the angle $\theta 1$ is the same as the absolute value of the angle $\theta 2$.

In FIG. 3, a double-headed arrow RD represents a circumferential distance between adjacent first portions 46. The distance RD is the same as a circumferential distance between adjacent second portions 48. A double-headed arrow L represents a circumferential length of the third portion 50. A ratio (L/RD) of the length L to the distance RD is preferably 0.8 or greater and 1.2 or less. By setting the ratio (L/RD) in this way, the balance of rigidity of the tire 10 in the vicinity of the end of the band 24 is well adjusted. In the tire 10, the balance of rigidity in the vicinity of the end of the band 24 is effectively suppressed. This contributes to the stability during full bank. The tire 10 is excellent in operation stability during full bank. From this point of view, the ratio (L/RD) is more preferably 0.9 or greater and 1.1 or less. The ratio (L/RD) is most preferably 1.0. At this moment, an end of the third portion 50 contacts an end of the adjacent third portion 50. That is, the third portions 50 are arranged with no gap and no overlap therebetween. It is most preferable that the third portions 50 are arranged with no gap and no overlap therebetween.

Figure 5:
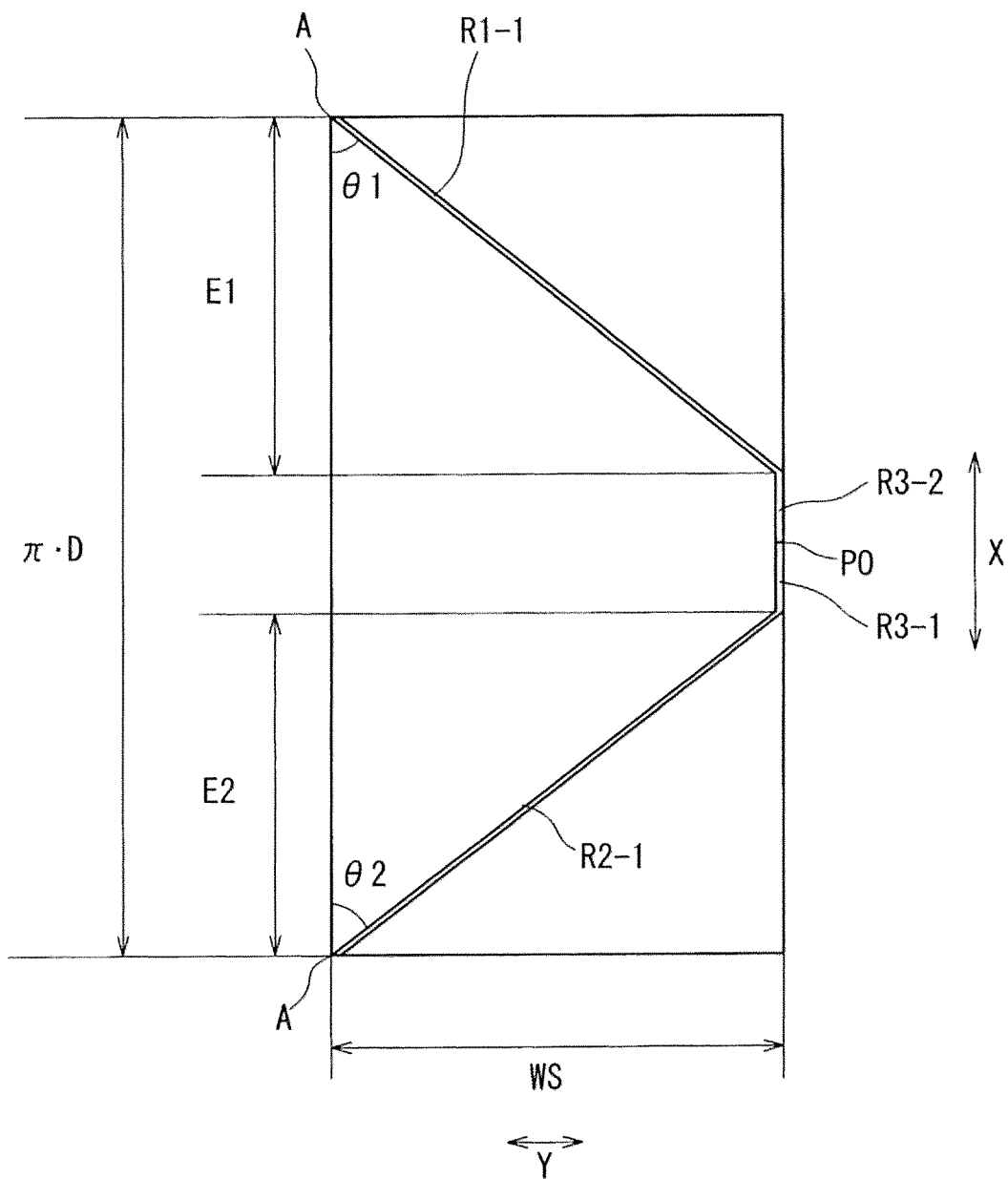
FIG. 5 is an unfolded view showing a state in which a step of forming the band in FIG. 3 is in progress.

Various methods may be considered for winding the band body 52 to arrange the third portions 50 with no gap and no overlap therebetween. One example of the winding methods is shown in FIG. 5. FIG. 5 is an unfolded view of the shoulder portion S wound around the core. In the drawing, a double-headed arrow X represents the circumferential direction, and a double-headed arrow Y represents the axial direction. In the drawing, point A at an upper end and point A at a lower end represent the same position. When a diameter of the core is represented by D, and m is defined as the ratio of the circumference of a circle to its diameter, a distance between point A at the upper end and point A at the lower end is π·D. In the drawing, a double-headed arrow WS represents an axial width of the shoulder portion S.

The drawing shows a state in which the second band body 44 is being wound. In the drawing, the winding of the second band body 44 is started from point P0. In this example, the formation starts from the third portion 50. In the drawing, a state is shown in which, by winding the second band body 44, a third portion (R3-1) is formed, a second portion (R2-1) is formed, a first portion (R1-1) and a third portion (R3-2) is formed. This is a state in which the core has completed one revolution. As shown in the drawing, the third portion (R3-1) and the third portion (R3-2) are arranged with no gap and no overlap therebetween. Although not illustrated, next, the second portion 48 is formed extending from an end of the third portion (R3-2). By repeating this process, the second band body 44 is wound in a meshed manner. In FIG. 5, a double-headed arrow E1 represents a circumferential length of the first portion 46, and a double-headed arrow E2 represents a circumferential length of the second portion 48.

Finally, in order to arrange all the third portions 50 with no gap and no overlap therebetween, a total number of revolutions of the core may be set to N, and N·L=π·D. That is, the length L of the third portion 50 may be determined so as to satisfy a relation of L=π·D/N. Furthermore, as clear from the drawing, since the sum of lengths E1 and E2 is (π·D−2·L), i.e., L·(N−2), E1+E2=WS/tan θ1+WS/tan (−θ2)=L·(N−2). However, in this equation, the angle θ1 has a positive value, and the angle θ2 has a negative value. The angles θ1 and θ2 may be determined so as to satisfy the above. When the absolute values of the angles θ1 and θ2 are equal to each other, the angle θ1 may be determined so that 2·WS/tan θ1=L·(N−2), i.e., tan θ1=2·WS/(L·(N−2)).

In FIG. 1, a double-headed arrow WC represents a width from the equatorial plane CL to an axially outer end of the center portion C, measured along an outer surface of the band 24. A double-headed arrow WT represents a width from the equatorial plane to the axially outer end of the shoulder portion S, measured along the outer surface of the band 24. A ratio (WC/WT) of the width WC to the width WT is preferably 0.1 or greater. By setting the ratio (WC/WT) to 0.1 or greater, the center portion C effectively contributes to the binding force of the band 24. In this tire, deformation of the tread caused by centrifugal force during high-speed traveling is suppressed. Furthermore, the center portion C suitably suppresses the torsional rigidity of the tire 10 in the vicinity of the center of the tread 12. The tire 10 including the band 24 suppresses kickback from occurring during high-speed traveling. The tire 10 is excellent in high speed stability.

A ratio (WS/WT) is preferably 0.3 or greater. By setting the ratio (WS/WT) to 0.3 or greater, the shoulder portion S has a sufficient width. The shoulder portion S effectively contributes to the torsional rigidity of the band 24. The torsional rigidity of the tire 10 at this part is high. The tire 10 including the band 24 has a large cornering power. The tire 10 is excellent in response and turning ability.

As described above, it is preferable that the first band body 38 is the same as the second band body 44 and that they are jointlessly connected to each other. That is, it is preferable that a common band body is wound to form the center portion C and the shoulder portion S. Accordingly, in this band 24, numbers of endpoints of the first band body 38 and endpoints of the second band body 44 can be decreased as compared to those of the tire 10 in which the first band body 38 and the second band body 44 are not jointlessly connected to each other. This improves uniformity of the tire 10. This tire 10 is excellent in uniformity.

In the present invention, the dimensions and angles of the components of the tire 10 are measured in a state in which the tire 10 is incorporated into a normal rim, and the tire 10 is filled with air so as to obtain a normal internal pressure. During the measurement, no load is applied to the tire 10. In this specification, "normal rim" means a rim specified according to a standard on which the tire 10 is based. The "standard rim" in the JATMA standard, the "design rim" in the TRA standard, and the "measuring rim" in the ETRTO standard are normal rims. In this specification, "normal internal pressure" means an internal pressure specified according to a standard on which the tire 10 is based. The "maximum air pressure" in the JATMA standard, the "maximum value" described in "Tire Load Limits at Various Cold Inflation Pressures" in the TRA standard, and the "inflation pressure" in the ETRTO standard are normal internal pressures.

EXAMPLES

Effects of the present invention are hereinafter disclosed by examples, but the present invention should not be construed in a limited manner based on the description of these examples.

Example 1

A pneumatic tire having the structure shown n FIG. 1 was manufactured. The size of this tire is "120/70ZR17." A band of this tire has the structure shown in FIG. 3. This is shown as "FIG. 3" in the column "Band structure" in Table 1. In this tire, the third portions are arranged in the circumferential direction with no gap and no overlap therebetween. The absolute value of the inclination angle θ1 was set to be the same as the absolute value of the inclination angle θ2. In this tire, a common band body is wound to form the center portion C and the shoulder portion S. That is, the first band body is the same as the second band body. The number of cords of this band body is three, and a distance between the cords is 1 mm.

Comparative Example 1

A tire of Comparative Example 1 was obtained in the same manner as in Example 1 except that the entire band had a structure in which a band body was wound in the circumferential direction. This was a conventional tire.

Comparative Example 2

Figure 6:
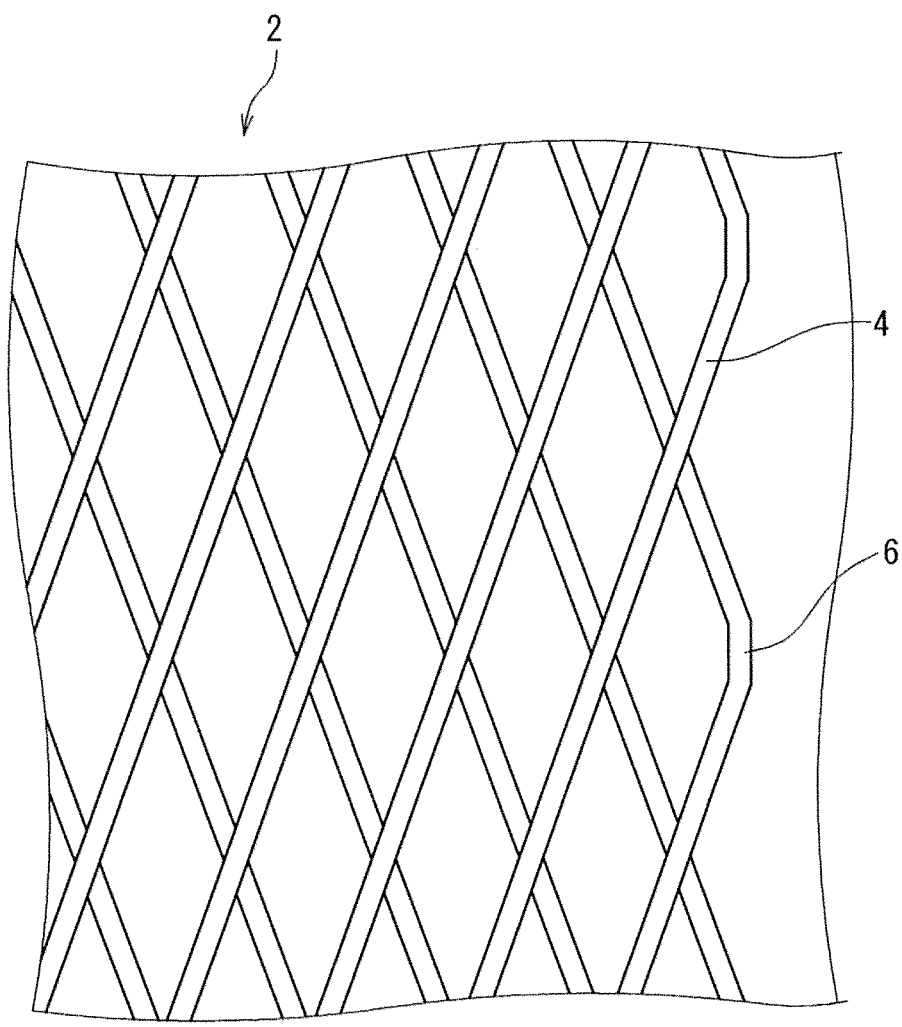
FIG. 6 is a plan view showing a structure of a band of a conventional tire.

A tire of Comparative Example 2 was obtained in the same manner as in Example 1 except that the band had the structure shown in FIG. 6. In this tire, a gap was present between adjacent third portions.

Comparative Example 3

A tire of Comparative Example 3 was obtained in the same manner as in Comparative Example 2 except that the third portions were arranged in the circumferential direction with no gap and no overlap therebetween.

Examples 2-5 and Comparative Example 4

Tires of Examples 2 to 5 and Comparative Example 4 were obtained in the same manner as in Example 1 except that the absolute value of the inclination angle θ1 and the absolute value of the inclination angle θ2 were set to the values shown in Table 2.

Examples 6-8

Tires of Examples 6 to 8 were obtained in the same manner as in Example 1 except that the quantity of the cords of the band was decreased to change the band cost to the values shown in Table 3. Moreover, the band cost is expressed by an index based on the cost of the band of the tire of Comparative Example 1 as 100.

[Cornering Power]

The cornering power (CP) was measured using a flat belt tire tester under the following measurement conditions.
Rim used: MT3.50×17
Internal pressure: 250 kPa
Load: 1.3 kN
Speed: 30 km/h
Camber angle: 0°
Slip angle: 1°

The results were indexes based on the value of Comparative Example 1 being set as 100 and were shown in the following Tables 1 to 3. The greater the value, the larger the cornering power.

[Response, Turning Ability, Stability During Bank, and Kickback Resistance]

A trial tire was incorporated into a standard rim (size=MT3.50×17) and was mounted on a front wheel of a two-wheeled vehicle having a displacement of 1000 cc. An internal pressure of this tire was 250 kPa. On a rear wheel of the two-wheeled vehicle, a commercially available tire (size: 190/50ZR17) was mounted, and air was filled into the tire so that the internal pressure reached 290 kPa. The two-wheeled vehicle ran on a circuit course having an asphalt road surface, and sensory evaluation by a rider was carried out. Evaluation items included response, turning ability, stability during bank, and kickback resistance. The results were shown in the following Tables 1 to 3 with 10 points as full marks. A greater value is preferred.

[Tire Strength]

A trial tire was incorporated into a standard rim (size=MT3.50×17) and air was filled into the tire so that the internal pressure reached 290 kPa. An iron bar was pressed against the tread surface 26 of this tire, and the force at break of the tire was measured. In Tables 1 to 3, a value equal to or greater than a standard value is expressed as A, and a value less than the standard value is expressed as B.

TABLE 1

| | Evaluation Result | | | |
|---|---|---|---|---|
| | Comparative Example 1 | Comparative Example 2 | Comparative Example 3 | Example 1 |
| Band structure | Circumferential direction | FIG. 6 | FIG. 6 | FIG. 3 |
| Absolute values of θ1 and θ2 [°] | — | 3 | 3 | 3 |

TABLE 1-continued

| | Evaluation Result | | | |
|---|---|---|---|---|
| | Comparative Example 1 | Comparative Example 2 | Comparative Example 3 | Example 1 |
| Gap between third portions | — | Existent | Non-existent | Non-existent |
| Ratio (WC/WT) [%] | 0 | 0 | 0 | 20 |
| Band cost [%] | 100 | 100 | 100 | 100 |
| CP | 100 | 120 | 120 | 130 |
| Response | 5 | 8 | 8 | 8 |
| Turn ability | 5 | 8 | 8 | 8 |
| Stability during bank | 5 | 3 | 5 | 5 |
| Kickback resistance | 5 | 3 | 3 | 5 |
| Tire strength | A | A | A | A |

TABLE 2

| | Evaluation Result | | | | |
|---|---|---|---|---|---|
| | Comparative Example 4 | Example 2 | Example 3 | Example 4 | Example 5 |
| Band structure | FIG. 3 | FIG. 3 | FIG. 3 | FIG. 3 | FIG. 3 |
| Absolute values of θ1 and θ2 [°] | 0.5 | 2 | 5 | 9 | 11 |
| Gap between third portions | Non-existent | Non-existent | Non-existent | Non-existent | Non-existent |
| Ratio (WC/WT) [%] | 20 | 20 | 20 | 20 | 20 |
| Band cost [%] | 100 | 100 | 100 | 100 | 100 |
| CP | 100 | 110 | 135 | 140 | 150 |
| Response | 5 | 7 | 8 | 9 | 10 |
| Turn ability | 5 | 7 | 8 | 9 | 9 |
| Stability during bank | 5 | 5 | 5 | 5 | 3 |
| Kickback resistance | 5 | 5 | 5 | 4 | 3 |
| Tire strength | A | A | A | A | A |

TABLE 3

| | Evaluation Result | | |
|---|---|---|---|
| | Example 6 | Example 7 | Example 8 |
| Band structure | FIG. 3 | FIG. 3 | FIG. 3 |
| Absolute values of θ1 and θ2 [°] | 3 | 3 | 3 |
| Gap between third portions | Non-existent | Non-existent | Non-existent |
| Ratio (WC/WT) [%] | 20 | 20 | 20 |
| Band cost [%] | 50 | 60 | 80 |
| CP | 100 | 105 | 115 |
| Response | 5 | 6 | 7 |
| Turn ability | 6 | 5 | 7 |
| Stability during bank | 5 | 5 | 5 |
| Kickback resistance | 5 | 5 | 5 |
| Tire strength | A | A | A |

As shown in Tables 1 to 3, the tires of Examples were evaluated higher than those of Comparative Examples. From the evaluation results, the superiority of the present invention is clear.

INDUSTRIAL APPLICABILITY

The methods explained above are applicable to manufacture of various tires.

What is claimed is:

1. A pneumatic tire for two-wheeled vehicles, comprising a tread; and
a band, wherein
the band is located on a radial inside of the tread; and
the band comprises a center portion located in an axial center, and a shoulder portion located on an axial outside of the center portion, wherein
the center portion has a helically wound structure in which a first band body comprising a first cord is wound in a circumferential direction;
the shoulder portion has a meshed structure formed by a second band body comprising a second cord; and
the shoulder portion comprises a plurality of first portions, a plurality of second portions and a plurality of third portions, wherein
each of the first portions is inclined in a direction with respect to the circumferential direction and extends from an axially inner end of the shoulder portion to an axially outer end of the shoulder portion;
each of the second portions is inclined in an opposite direction opposite to the direction of the first portion with respect to the circumferential direction and extends from the axially inner end of the shoulder portion to the axially outer end of the shoulder portion;
each of the third portions extends parallelly along the circumferential direction on the axially outer end of the shoulder portion, wherein an end of one of the third portions contacts an end of another one of the third portions adjacently disposed with the one of the third portions, and each two of the third portions are arranged in the circumferential direction with no gap and no overlap therebetween; and
the plurality of the first portions, the plurality of the second portions and the plurality of the third portions are jointlessly connected so as to form one second band body;
wherein a circumferential distance between adjacent first portions or between adjacent second portions is represented as RD,
a circumferential length of the third portion is represented as L, and
a ratio (L/RD) of the circumferential length L to the circumferential distance RD is equal to 1.0.

2. The pneumatic tire according to claim 1, wherein one end of each of the first portions is connected to one end of each of the third portions, and the other end of the each of the third portions is connected to one end of each of the second portions, thereby forming a basic unit, wherein
the basic units are repeatedly connected to each other.

3. The pneumatic tire according to claim 1, wherein the first band body is the same as the second band body, and the first band body is jointlessly connected to the second band body at a boundary between the center portion and the shoulder portion.

4. The pneumatic tire according to claim 1, wherein an absolute value of an inclination angle $\theta 1$ of the first portion with respect to the circumferential direction is 1° or greater and 10° or less, and an absolute value of an inclination angle $\theta 2$ of the second portion with respect to the circumferential direction is 1° or greater and 10° or less.

5. The pneumatic tire according to claim 4, wherein the absolute value of the inclination angle $\theta 1$ is the same as the absolute value of the inclination angle $\theta 2$.

6. The pneumatic tire according to claim 1, wherein the shoulder portion is located on both axial outsides of the center portion.

7. A method for manufacturing a pneumatic tire for two-wheeled vehicles, the pneumatic tire comprising a tread, and a band located on a radial inside of the tread, the band comprising a center portion located in an axial center thereof and a shoulder portion located on an axial outside of the center portion, wherein the method comprises
a step of laminating the band; and
a step of laminating the tread, wherein the step of laminating the band further comprises
a step of winding a second band body in a meshed manner to obtain the shoulder portion; and
a step of winding a first band body in a circumferential direction to obtain the center portion, wherein
in the step to obtain the shoulder portion, the second band body is wound in the meshed manner by repeating: a step of inclining the second band body in a direction with respect to the circumferential direction and winding the second band body from a position taken as an axially inner end of the shoulder portion to a position taken as an axially outer end of the shoulder portion; a step of winding the second band body in the circumferential direction in the position taken as the axially outer end of the shoulder portion; and a step of inclining the second band body in an opposite direction opposite to the direction with respect to the circumferential direction and winding the second band body from the position taken as the axially outer end of the shoulder portion to the position taken as the axially inner end of the shoulder portion;
wherein the shoulder portion comprises a plurality of first portions, a plurality of second portions and a plurality of third portions, wherein
each of the first portions is inclined in the direction with respect to the circumferential direction and extends from the axially inner end of the shoulder portion to the axially outer end of the shoulder portion;
each of the second portions is inclined in the opposite direction opposite to the direction of the first portion with respect to the circumferential direction and extends from the axially inner end of the shoulder portion to the axially outer end of the shoulder portion;
each of the third portions extends parallelly along the circumferential direction on the axially outer end of the shoulder portion, wherein an end of one of the third portions contacts an end of another one of the third portions adjacently disposed with the one of the third portions, and each two of the third portions are arranged in the circumferential direction with no gap and no overlap therebetween; and
the plurality of the first portions, the plurality of the second portions and the plurality of the third portions are jointlessly connected so as to form one second band body;
wherein a circumferential distance between adjacent first portions or between adjacent second portions is represented as RD, a circumferential length of the third portion is represented as L, and a ratio (L/RD) of the circumferential length L to the circumferential distance RD is equal to 1.0.

* * * * *